US011362973B2

(12) United States Patent
Jensen (10) Patent No.: US 11,362,973 B2
(45) Date of Patent: Jun. 14, 2022

(54) SYSTEM AND METHOD FOR PROVIDING UNIQUE INTERACTIVE MEDIA CONTENT (71) Applicant: MAXOGRAM MEDIA INC., Kelowna (CA)

(72) Inventor: Matthew Jensen, Kelowna (CA)

(*) Notice: Subject to any disclaimer, the term of this patent is extended or adjusted under 35 U.S.C. 154(b) by 0 days.

(21) Appl. No.: 16/706,551

(22) Filed: Dec. 6, 2019

(65) Prior Publication Data
US 2021/0176196 A1 Jun. 10, 2021

(51) Int. Cl.
*H04L 51/10* (2022.01)
*G06F 16/535* (2019.01)
*H04N 21/431* (2011.01)
*H04N 21/47* (2011.01)
*G06V 20/10* (2022.01)

(52) U.S. Cl.
CPC ............ *H04L 51/10* (2013.01); *G06F 16/535* (2019.01); *G06V 20/10* (2022.01); *H04N 21/4316* (2013.01); *H04N 21/47* (2013.01)

(58) Field of Classification Search
CPC ....... H04M 1/6505; H04N 5/253; H04N 3/36; H04N 21/4316; H04N 21/47; G01N 23/04; G01N 21/5911; G11B 20/10; B41F 33/0036; H04L 51/10; H04L 5/10; G06K 9/00664; G06F 16/535; G06V 20/10; G06N 21/17; G06N 21/43; G06N 21/431; G06N 21/4312
See application file for complete search history.

(56) References Cited

U.S. PATENT DOCUMENTS

| 6,549,913 | B1* | 4/2003 | Murakawa | G06F 16/532 |
| 7,043,640 | B2* | 5/2006 | Pritchard | G06F 21/31 |
| | | | | 713/170 |
| 7,834,082 | B2* | 11/2010 | Haider | C08L 83/12 |
| | | | | 524/588 |
| 9,390,358 | B1 | 6/2016 | Cheung | |
| 9,811,245 | B2* | 11/2017 | Poletto | H04L 67/30 |
| 9,811,773 | B2 | 11/2017 | Cheung | |
| 9,860,201 | B2* | 1/2018 | Chiu | H04L 51/08 |
| 10,148,626 | B2 | 12/2018 | Goad | |
| 10,559,010 | B2* | 2/2020 | Spitz | H04N 21/4725 |
| 10,565,760 | B2* | 2/2020 | Sullivan | G06Q 20/123 |

(Continued)

FOREIGN PATENT DOCUMENTS

| CA | 2891677 | 5/2014 |
| CA | 3004488 | 4/2017 |

(Continued)

*Primary Examiner* — Sargon N Nano
(74) *Attorney, Agent, or Firm* — Richard D. Okimaw (57) ABSTRACT

A system and method for displaying content to a user comprises a database containing a plurality of media, each of the plurality of media having an associated user image and a processor operably coupled to the database. The processor is configured to receive an image captured by a user device, receive an inputted code entered into the user device, lookup a specific media content corresponding to the image and the code and transmit the specific media content to the user device for display to the user in real time. The method comprises receiving the scanned image and the inputted code, looking up the specific media corresponding to the scanned image and the code and transmitting in real time, the specific media to the user device for display to the user.

15 Claims, 6 Drawing Sheets

(56) References Cited

U.S. PATENT DOCUMENTS

| | | | |
|---|---|---|---|
| 11,003,327 B2* | 5/2021 | Poletto | G06F 3/0486 |
| 2002/0057203 A1* | 5/2002 | Borders | A61G 13/08 |
| | | | 340/573.1 |
| 2005/0195077 A1* | 9/2005 | McCulloch | G16H 40/67 |
| | | | 340/500 |
| 2006/0129511 A1* | 6/2006 | Wu | H04N 1/00315 |
| 2006/0143453 A1* | 6/2006 | Imamoto | H04L 9/0891 |
| | | | 713/169 |
| 2007/0016490 A1* | 1/2007 | Nowak | G06Q 10/0875 |
| | | | 705/26.35 |
| 2008/0005767 A1* | 1/2008 | Seo | H04N 21/4316 |
| | | | 725/62 |
| 2011/0119350 A1 | 5/2011 | Koshiba | |
| 2011/0151928 A1* | 6/2011 | Montgomery | G06K 9/2036 |
| | | | 455/556.1 |
| 2012/0130819 A1 | 5/2012 | Willcock et al. | |
| 2013/0162911 A1* | 6/2013 | Glen | H04N 21/4307 |
| | | | 348/586 |
| 2013/0230210 A1* | 9/2013 | Boncyk | G06T 7/00 |
| | | | 382/103 |
| 2013/0233916 A1* | 9/2013 | Tran | G06F 16/00 |
| | | | 235/375 |
| 2013/0246132 A1* | 9/2013 | Buie | G06Q 20/20 |
| | | | 705/13 |
| 2014/0132717 A1* | 5/2014 | Laabs | H04N 13/161 |
| | | | 348/43 |
| 2014/0172408 A1* | 6/2014 | Vukosavljevic | G06K 9/6821 |
| | | | 704/2 |
| 2014/0358683 A1 | 12/2014 | Panicali | |
| 2015/0177937 A1* | 6/2015 | Poletto | G06F 3/167 |
| | | | 715/739 |
| 2015/0296180 A1* | 10/2015 | Shi | H04N 7/15 |
| | | | 348/14.1 |
| 2015/0365234 A1* | 12/2015 | Marten | G06F 21/36 |
| | | | 713/183 |
| 2016/0150184 A1* | 5/2016 | Gandhi | H04N 7/147 |
| | | | 348/14.08 |
| 2016/0212370 A1* | 7/2016 | Lee | H04N 21/47 |
| 2018/0024715 A1* | 1/2018 | Poletto | G06F 3/0484 |
| | | | 715/739 |
| 2018/0253765 A1* | 9/2018 | Avedissian | H04N 21/4828 |
| 2018/0293603 A1* | 10/2018 | Glazier | H04L 67/22 |
| 2018/0300364 A1 | 10/2018 | Xu | |
| 2019/0166078 A1* | 5/2019 | Tsai | H04L 51/08 |
| 2019/0214055 A1* | 7/2019 | Alexandru | H04N 9/8715 |
| 2019/0325498 A1* | 10/2019 | Clark | G06K 7/1417 |
| 2020/0034819 A1* | 1/2020 | Melo | G06Q 20/3278 |
| 2020/0193001 A1* | 6/2020 | Qin | G06F 3/0482 |
| 2020/0193707 A1* | 6/2020 | Edwards | G06F 3/0325 |

FOREIGN PATENT DOCUMENTS

| | | |
|---|---|---|
| EP | 1359757 | 11/2003 |
| WO | 0070525 | 11/2000 |
| WO | 2004080097 | 9/2004 |

\* cited by examiner

SYSTEM AND METHOD FOR PROVIDING UNIQUE INTERACTIVE MEDIA CONTENT

BACKGROUND OF THE INVENTION

1. Field of Invention

The present invention relates generally to displaying mobile media content and in particular to a system and method for displaying interactive media content to a user that is unique and specific to that user.

2. Description of Related Art

Marketing and reaching target audiences to provide them with relevant content is increasingly difficult. Users are being increasingly provided with ads in every location available and in particular during online experiences. Such frequency of advertisement presentation to users, makes their attention increasingly difficult to catch. This becomes particularly difficult in markets having a wider variety of messages that each target group may want, such as greeting cards and the like.

In addition, users or message senders may want to customize the individual message provided to a particular end user or recipient. Currently, such ability has been largely limited by technical ability of the sender or the quality of the available message or media that can be sent. In particular, senders may record their individual message on the device, such as a greeting card or gift which then plays the message back to the recipient on demand such as pushing a button. It will be appreciated that such systems are limited to the complexity of the message that may be played back to the recipient.

SUMMARY OF THE INVENTION

According to a first embodiment of the present invention there is disclose a system for displaying content to a user comprising a database containing a plurality of media, each of the plurality of media having an associated user image and a processor operably coupled to the database. The processor is configured to receive an image captured by a user device, receive an inputted code entered into the user device, lookup specific media content corresponding to the image and the code and transmit the specific media content to the user device for display to the user in real time.

The specific media content may comprise a video file. The video file may be recorded by a sender. The scanned image may correspond to at least two of the plurality of media.

The user device may comprise a camera operable to capture an image and a display operable to display media content to a user. The system may further comprise user software installed on the user device configured to interface with the camera so as to capture the image, interface with the processor so as to transmit the image and the code to the processor and interface with the display so as to display the specific media content received from the processor.

The user software may further be configured to receive and transmit the code to the processor. The user software may further be configured to display the specific media content on the display while displaying an image captured by the camera. The user software may further be configured to index the specific media content to the image. The user software may further be configured to maintain the specific media over the image.

According to a further embodiment of the present invention there is disclosed a computer implemented method of displaying user specific content to a user comprising receiving at a processor as scanned by a user device, a scanned image, receiving at the processor, an inputted code, utilizing the processor, looking up in a database containing a plurality of media, a specific media corresponding to the scanned image and the code and transmitting in real time, the specific media to the user device for display to the user.

The image may correspond to at least two of the plurality of media. The specific media may comprise a video file. The video file may be played on a screen of the user device.

The video file may be overlayed on an image on the screen. The video file may be overlayed over the image. The video file may be fixed to the scanned image on the screen independent of movement of the user device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view, FIG. 1 is an illustration of a system for providing individualized media content to a user according to a first embodiment of the present invention.

DETAILED DESCRIPTION

Referring to FIG. 1, a system for selecting and displaying content to a user according to a first embodiment of the invention is shown generally at 10.

The system comprises a database 12 in communication with a processor 14 which is operable to receive a scanned or otherwise identified image from a user device 16 across a network 18. The processor then looks up a specific and unique media file corresponding to both the image and an inputted code which is provided to the mobile device for display to the user. As illustrated in FIG. 1, the image may be located on an object, such as a business card 8 or of a picture 6 located on that object. It will be appreciated that any picture or object may be utilized with the present method including, but not limited to greeting cards, images on consumer objects, drink bottles etc. The present method will therefore permit a customized message, advertisement or any other content to the user which is customized by their inputted code. In particular, as will be more fully described below each code that is inputted into the system will result in a different specific media being displayed to that user for the same picture or object.

Figure 2:
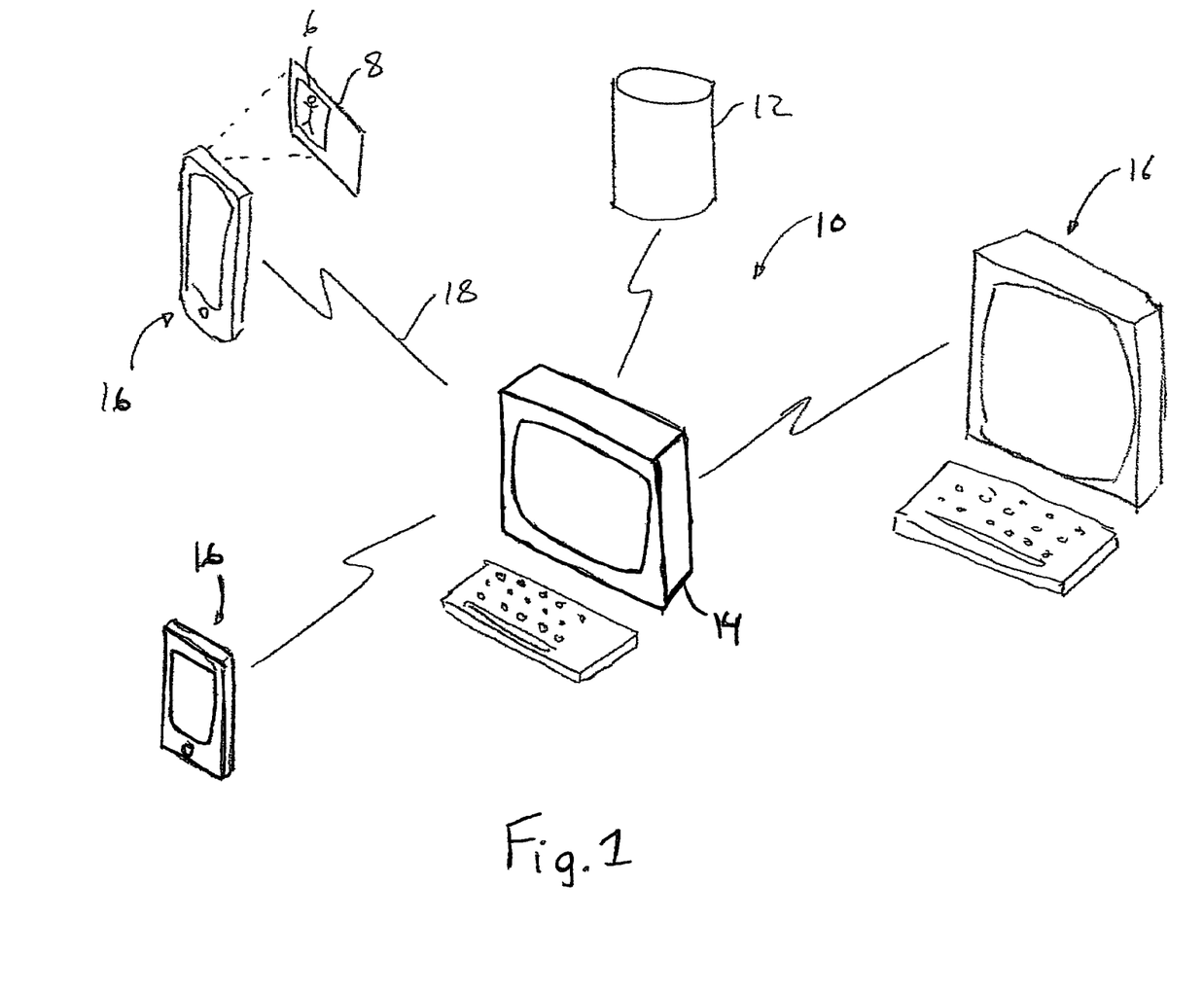
FIG. 2 is a block diagram of the system of FIG. 1.

Turning now to FIG. 2, the system 10 comprises the processor 14, and memory 20 that stores machine instructions that, when executed by the processor 14, cause the processor 14 to perform one or more of the operations and methods described herein. The processor 14 may optionally contain a cache memory unit for temporary local storage of instructions, data, or computer addresses. The system 10 further includes a database 12 or data storage of any conventional type operable to store information as set out above and may optionally include an input device 22, display 24 for receiving and displaying inputs from an administrator or user and a network interface 26 as are commonly known. As outlined above, the processor 14 is adapted to receive scanned images and codes and select the appropriate media from the database 12 and transmit such media to the user device 16 for display to a user.

More generally, in this specification, the term "processor" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other. Additional types of processor(s) will be apparent to those ordinarily skilled in the art upon review of this specification, and substitution of any such other types of processor(s) is considered not to depart from the scope of the present invention as defined herein. In various embodiments, the processor 14 can be implemented as a single-chip, multiple chips and/or other electrical components including one or more integrated circuits and printed circuit boards.

Computer code comprising instructions for the processor(s) to carry out the various embodiments, aspects, features, etc. of the present disclosure may reside in the memory 20. The code may be broken into separate routines, products, etc. to carry forth specific steps disclosed herein. In various embodiments, the processor 14 can be implemented as a single-chip, multiple chips and/or other electrical components including one or more integrated circuits and printed circuit boards. The processor 14 together with a suitable operating system may operate to execute instructions in the form of computer code and produce and use data. By way of example and not by way of limitation, the operating system may be Windows-based, Mac-based, or Unix or Linux-based, among other suitable operating systems. Operating systems are generally well known and will not be described in further detail here.

Memory 20 may include various tangible, non-transitory computer-readable media including Read-Only Memory (ROM) and/or Random-Access Memory (RAM). As is well known in the art, ROM acts to transfer data and instructions uni-directionally to the processor 14, and RAM is used typically to transfer data and instructions in a bi-directional manner. In the various embodiments disclosed herein, RAM includes computer program instructions that when executed by the processor 14 cause the processor 14 to execute the program instructions described in greater detail below. More generally, the term "memory" as used herein encompasses one or more storage mediums and generally provides a place to store computer code (e.g., software and/or firmware) and data. It may comprise, for example, electronic, optical, magnetic, or any other storage or transmission device capable of providing the processor 14 with program instructions. Memory 20 may further include a floppy disk, CD-ROM, DVD, magnetic disk, memory chip, ASIC, FPGA, EEPROM, EPROM, flash memory, optical media, or any other suitable memory from which processor 14 can read instructions in computer programming languages.

It will be appreciated that the user device 16 may be any commonly known user device, such as, by way of non-limiting example, a tablet, laptop computer, smartphone, PDA, ultra mobile PC (UMPC), desktop computer, server or any other viewable monitors or screens including smart glasses etc. It will be understood that the architecture herein is provided for example purposes only and does not limit the scope of the various implementations of the communication systems and methods. As will be further described below, the user device 16 is adapted communicate with the processor 14 through the network either through a program installed thereon or operated through a web application as are commonly known. The user device 16 may communicate with the processor 14 via a network as are commonly known including local area networks (LAN), wide area networks (WAN), internet and cellular networks and radio transmissions.

The instructions to the processor 14 may comprise one or more algorithm that matches an image scanned by the user device 16 along with a code inputted into the user device to select a specific image from the database 12. In particular, the algorithm or instructions may comprise image recognition or identification algorithms to identify the image scanned and transmitted by the user device. Such image recognition algorithms are known and may comprise any known type such as, by way of non-limiting example, ARCore™ from Google™ and ARKit™ from Apple™ as well as other suitable solutions. Furthermore, as will be more fully described below, each scanned image as provided and transmitted by the user device 16, may be associated with more than one type of media in the database 12 such that the particular media selected and transmitted by the processor to the user device is customized or individualized depending upon the inputted code. It will be appreciated that any data structure may be utilized to associate each media file with the desired scanned image and code including by categories for each image and subcategories for individual codes or in one or more combined databases with each media file having an associated image and code required to select that media file.

Figure 3:
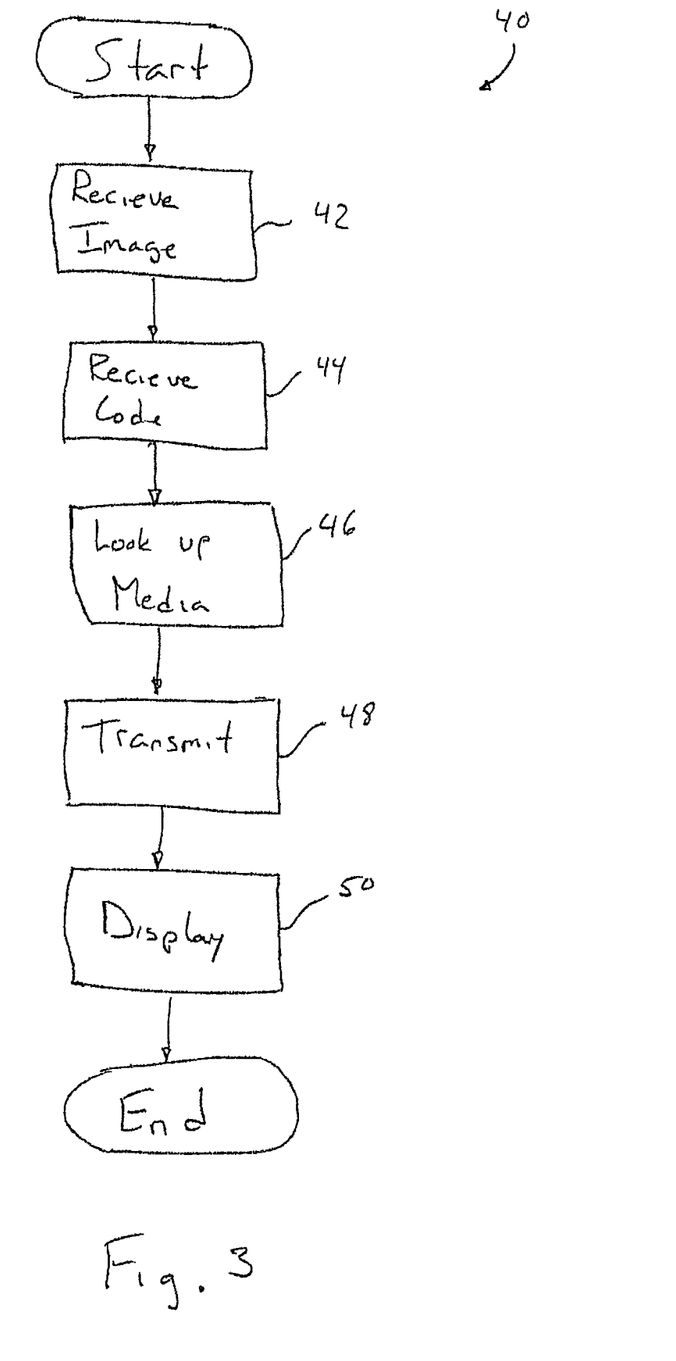
FIG. 3 is a block diagram of a method for providing individualized media content to a user using the system of FIG. 1.
Figure 4:
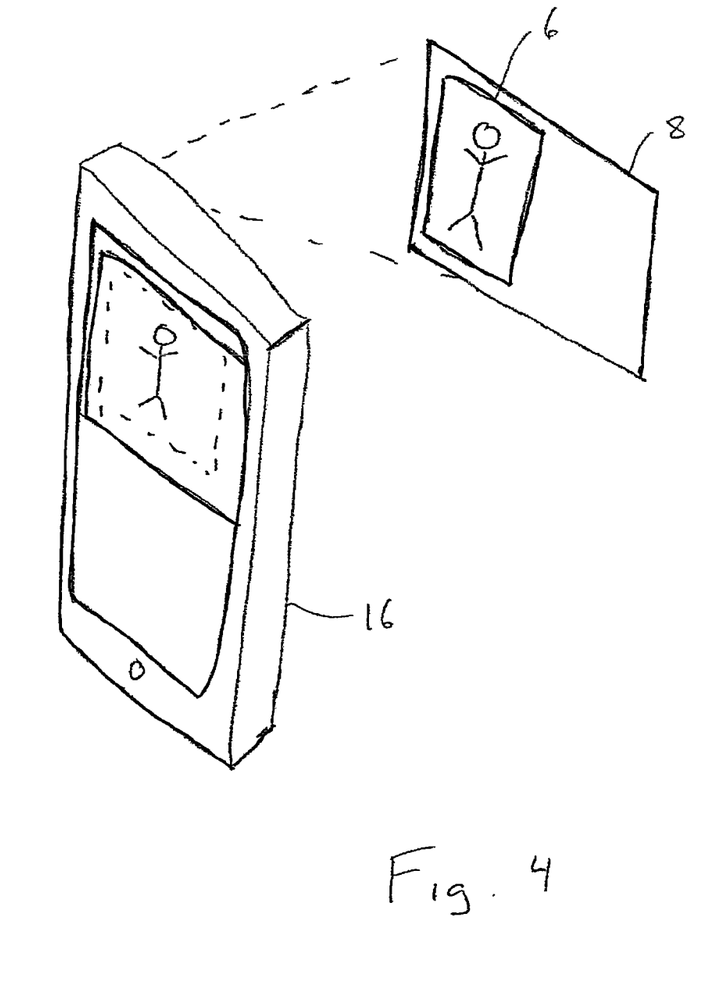
FIG. 4 is an illustration of a user device while scanning an image for use in the system of FIG. 1.
Figure 5:
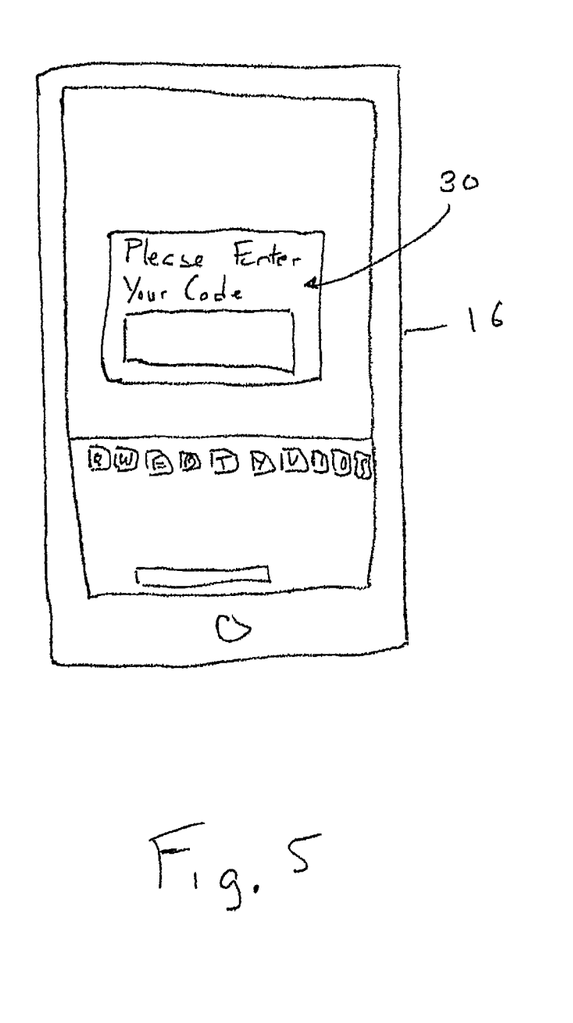
FIG. 5 is an illustration of the user interface while inputting a code for use in the system of FIG. 1.

Turning now to FIG. 3, the method of selecting the appropriate media for the user is illustrated at 40. The method is started by the processor receiving an image scanned or otherwise transmitted from the camera in the user device 16 for recognition by the processor 14. This scanning is illustrated in FIG. 4 in which the user device 16 scans or records an image 8 on an object. As illustrated in FIG. 4, the object is a card 8 although it will be appreciated the object may be any object including, consumer goods such as, by way of non-limiting example, bottles, greeting cards or advertising objects such as billboards and posters. It will be appreciated that a portion of the ware may be implemented on the user device so as to interface with the processor and may be activated on the user device 16 when desired by a user or may be adapted to scan or run automatically. The user device 16 then receives an inputted code into the user device 16 at step 44 and as illustrated in FIG. 5. Optionally, if no code is entered, the processor 14 may select a default media file to present to the user. In particular, the user device 16 may prompt the user for their user code with a pop-up window or the like. Optionally, the code may be stored in the user device and either automatically entered each time a user scans an image or presented in a popup window as is commonly known. After the image and the user code have been received, this information is transmitted to the processor which looks up the appropriate media in step 46. As set out above, each image that is included in the database may have several media files associated with it such that the specific inputted code is used to differentiate and personalize the media provided to that user. In step 48 this personalized media file is transmitted back to the user device in step 48 and displayed on the user device in step 50. In this way, each user may receive a personalized media file.

Figure 6:
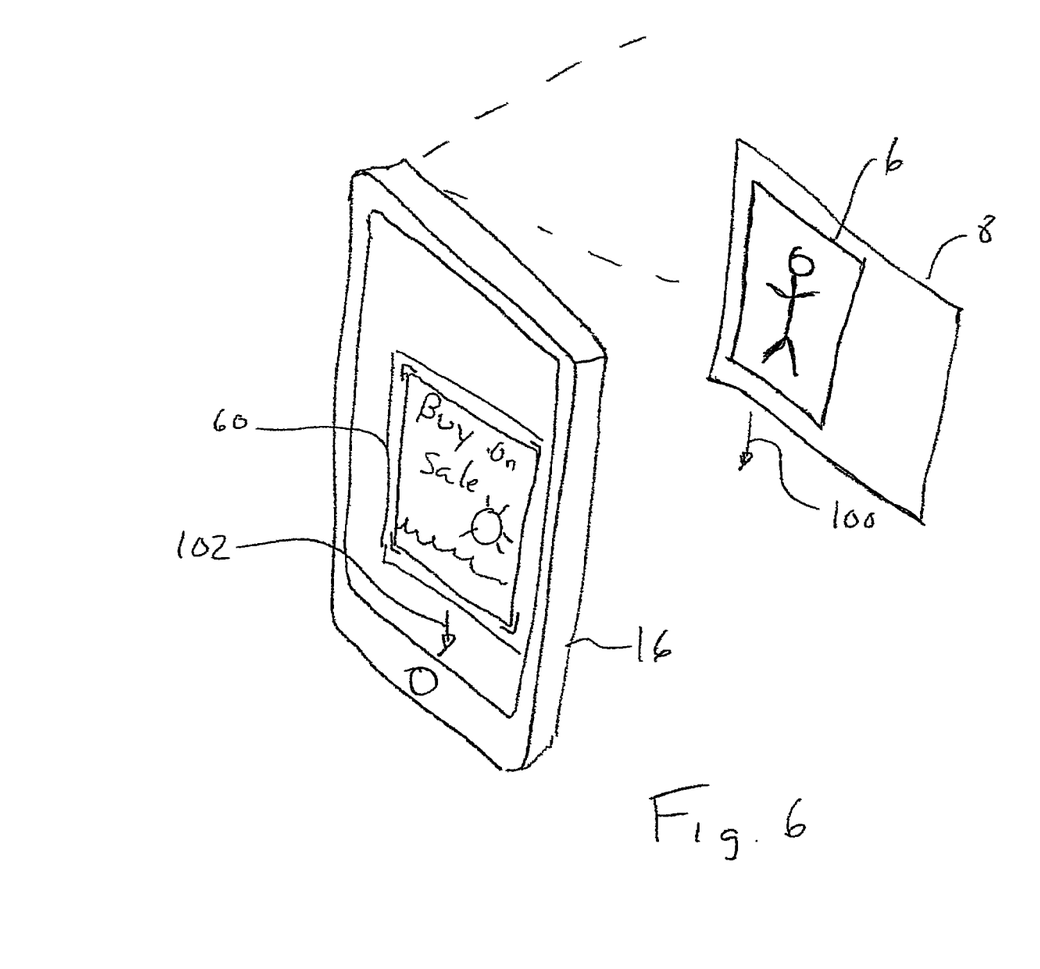
FIG. 6 is an illustration of a user device displaying an individualized media in the system of FIG. 1.

As illustrated in FIG. 6, the media file, which may comprise any type of media desired, including video, images, music files or the like, is displayed on the screen of the user device. As illustrated in FIG. 6, the media file 60, which may comprise a video is superimposed over the image of the object 8 as viewed through the camera of the user device. In particular, the media file 60 is superimposed over the image 6 which was utilized to select the media file previously so as to replace this image 6 when viewed through the screen of the user device 16 utilizing known techniques. In particular, the media file 60 may be indexed to the object 8 such that movement 100 of the object in a direction generally indicated at 100 results in movement of the media file 60 on the object 8 as viewed through the screen in a corresponding 102 so as to keep the media file 60 at the same relative position on the object as viewed through the screen.

The present system and method permits a unique or individualized media to be presented to a user based on their inputted code. This system may permit each user to receive a unique or personalized advertisement. In particular, advertisers may provide a code to each user which groups them according to their interests or language preferences. Each user group may then receive that advertisement which is deemed to me most appropriate for them. Additionally, gifting users may purchase or select an object, such as a gift card which has an image thereon included in the database. The gifting user may then record their own personalized message and associate it with a code. They may then give the article and the code to a receiving user who may then receive the customized message when they input the provided code. It will be appreciated that any object may be utilized for such purposes including gift cards, business cards, gift items such as stuffed animals or the like. Although the present system and method are described herein as providing custom content to a user, it may also be utilized to provide access to or unlock premium or additional content wherein only persons having the correct code and access to the correct scanned may be provided to the additional content.

While specific embodiments of the invention have been described and illustrated, such embodiments should be considered illustrative of the invention only and not as limiting the invention as construed in accordance with the accompanying claims.

What is claimed is:

1. A system for displaying content to a user comprising:
    a database containing a plurality of media, each of said plurality of media having an associated user image and a
    a processor operably coupled to said database and configured to:
        receive an image captured by a mobile user device;
        receive an inputted code entered into said mobile user device;
        lookup a specific video corresponding to said image and said code; and
        transmit said specific video to said mobile user device for display to said user in real time,
        wherein said user software is configured to display said video on said display while displaying an image captured by said mobile user device.

2. The system of claim 1 wherein said video file is recorded by a sender.

3. The system of claim 1 wherein said image captured corresponds to at least two of said plurality of media.

4. The system of claim 1 wherein said user device comprises
    a camera operable to identify an image; and
    a display operable to display media content to a user.

5. The system of claim 4 further comprising user software installed on said user device configured to:
    interface with said camera so as to capture said image;
    interface with said processor so as to transmit said image and said code to said processor; and
    interface with said display so as to display said specific video received from said processor.

6. The system of claim 5 wherein said user software is further configured to receive and transmit said code to said processor.

7. The system of claim 5 wherein said user software is configured to display said specific video on said display while displaying an image captured by said camera.

8. The system of claim 7 wherein said user software is configured to index said specific video to said image.

9. The system of claim 8 wherein said user software is configured to maintain said specific video over said image.

10. A computer implemented method of displaying user specific content to a user comprising:
    receiving at a processor as scanned by a mobile user device, a scanned image;
    receiving at said processor, an inputted code;
    utilizing said processor, looking up in a database containing a plurality of media, a specific video file corresponding to said scanned image and said code; and
    transmitting in real time, said specific video file to said mobile user device for display to said user while displaying an image captured by said mobile user device.

11. The method of claim 10 wherein said scanned image corresponds to at least two of said plurality of media.

12. The method of claim 10 wherein said specific video file is played on a screen of said user device.

13. The method of claim 12 wherein said specific video file is overlayed on an image on said screen.

14. The method of claim 13 wherein said specific video file is overlayed over said image.

15. The method of claim 14 wherein said specific video file is indexed to said scanned image on said screen independent of movement of said user device.

* * * * *